(12) United States Patent
Karuppiah et al.

(10) Patent No.: US 11,582,515 B2
(45) Date of Patent: Feb. 14, 2023

(54) SET TOP BOX HAVING DOWNLOADED EXTENDER SERVICE AGENT TO PROVIDE ENHANCED WI-FI COVERAGE

(71) Applicant: ARRIS Enterprises LLC, Suwanee, GA (US)

(72) Inventors: Sadeesh Kumar Karuppiah, Bangalore (IN); Praveen Girish, Bangalore (IN)

(73) Assignee: ARRIS ENTERPRISES LLC, Suwanee, GA (US)

(*) Notice: Subject to any disclaimer, the term of this patent is extended or adjusted under 35 U.S.C. 154(b) by 0 days.

(21) Appl. No.: 17/495,165

(22) Filed: Oct. 6, 2021

(65) Prior Publication Data

US 2022/0109909 A1 Apr. 7, 2022

Related U.S. Application Data

(60) Provisional application No. 63/088,609, filed on Oct. 7, 2020.

(51) Int. Cl.
| | |
|---|---|
| H04N 21/443 | (2011.01) |
| H04N 21/442 | (2011.01) |
| H04N 21/414 | (2011.01) |
| H04N 21/436 | (2011.01) |
| H04N 21/4363 | (2011.01) |
| H04W 8/00 | (2009.01) |

(Continued)

(52) U.S. Cl.
CPC ......... *H04N 21/4436* (2013.01); *H04L 67/34* (2013.01); *H04N 21/41407* (2013.01); *H04N 21/43615* (2013.01); *H04N 21/43637* (2013.01); *H04N 21/44218* (2013.01); *H04W 8/005* (2013.01); *H04W 48/10* (2013.01); *H04W 84/12* (2013.01)

(58) Field of Classification Search
CPC ......... H04N 21/4436; H04N 21/41407; H04N 21/43615; H04N 21/43637; H04N 21/44218; H04N 21/44227; H04N 21/64322; H04L 67/34; H04L 12/2834; H04L 12/2856; H04L 12/2898; H04L 12/66; H04L 65/1013; H04L 2012/2841; H04W 8/005; H04W 48/10; H04W 84/12; H04J 2203/0001; H04J 2203/0003
See application file for complete search history.

(56) References Cited

U.S. PATENT DOCUMENTS 8,315,266 B1 * 11/2012 Lam .................... H04L 65/1013
370/465
8,913,557 B2 * 12/2014 Klein ...................... H04B 3/50
370/328

(Continued)

*Primary Examiner* — Alazar Tilahun
(74) *Attorney, Agent, or Firm* — Wenderoth, Lind & Ponack, L.L.P.

(57) ABSTRACT

A set top box (STB) providing enhanced Wi-Fi coverage. The STB downloads and configures an extender service agent for implementing extender capability at the STB, pairing the extender service agent with a router, and providing extended wireless IP connectivity using a fronthaul connection via the antenna to clients in range of IP signals radiated by the antenna. When the STB uses a wired backhaul connection all of an available bandwidth is used for the fronthaul connection, and when a wireless backhaul connection is used, the available bandwidth is split between the backhaul connection and the fronthaul connection.

20 Claims, 7 Drawing Sheets

(51) Int. Cl.
*H04L 29/08* (2006.01)
*H04W 48/10* (2009.01)
*H04L 67/00* (2022.01)
*H04W 84/12* (2009.01)

(56) References Cited

U.S. PATENT DOCUMENTS

| | | | |
|---|---|---|---|
| 10,804,945 B1* | 10/2020 | Ram | H04B 1/123 |
| 11,061,977 B1* | 7/2021 | Raskar | H04N 21/4532 |
| 2011/0274029 A1* | 11/2011 | Connelly | H04W 12/50 |
| | | | 370/315 |
| 2013/0039239 A1* | 2/2013 | Lin | H04W 52/0229 |
| | | | 370/311 |
| 2020/0382469 A1* | 12/2020 | Rocquelay | H04L 41/12 |
| 2021/0352579 A1* | 11/2021 | Moreman | H04W 48/20 |

* cited by examiner

SET TOP BOX HAVING DOWNLOADED EXTENDER SERVICE AGENT TO PROVIDE ENHANCED WI-FI COVERAGE

BACKGROUND

The subject matter of the present disclosure relates generally to downloading and configuring an extender service agent for implementing extender capability to a set top box.

Wi-Fi need is increasing enormously, and user generally expects the coverage the entire home. Unfortunately having coverage to the entire home using a single Wi-Fi router is challenging due to obstacles that attenuates coverage to at least certain areas of a building. Currently user solves this problem by purchasing and installing extenders where Wi-Fi signals are poor. The installation of the extender in such places also require that the backhaul cable be laid out or extended to the desired place in the home.

SUMMARY

An aspect of the present disclosure involves downloading and configuring an extender service agent for implementing extender capability at the set top box. pairing the extender service agent with a router to provide broadband Internet connectivity via the backhaul connection, and providing, via a transceiver controlled by the extender service agent, extended wireless IP connectivity using a fronthaul connection via the antenna to clients in range of IP signals radiated by the antenna.

The backhaul connection includes an IP backhaul connection to the router for providing the wireless IP connectivity. The IP backhaul connection to the router may be a wired connection, wherein the fronthaul connection uses all of an available bandwidth of the transceiver and the antenna. Alternatively, the IP backhaul connection to the router may a wireless connection, wherein the fronthaul connection and the backhaul connection split an available bandwidth of the transceiver and the antenna.

The extender service agent provides user presence detection to provide a lower power mode that does not broadcast a Wi-Fi service set identifier (SSID). When the extender service agent detects a presence of a client device, the extender service agent switches to an operation mode to broadcast the Wi-Fi SSID to the client device. The extender service agent may be configured manually by downloading a configuration file and receiving setup input credentials that are entered manually to connect with the router and to provide the extended wireless IP connectivity. Alternatively, the extender service agent performs automatic configuration by connecting with a router service agent, wherein the router service agent provides configuration information to the extender service agent for completing setup of the extender service agent.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness.

Aspects of the present disclosure are directed to downloading and configuring an extender service agent for implementing extender capability to a set top box.

Figure 1:
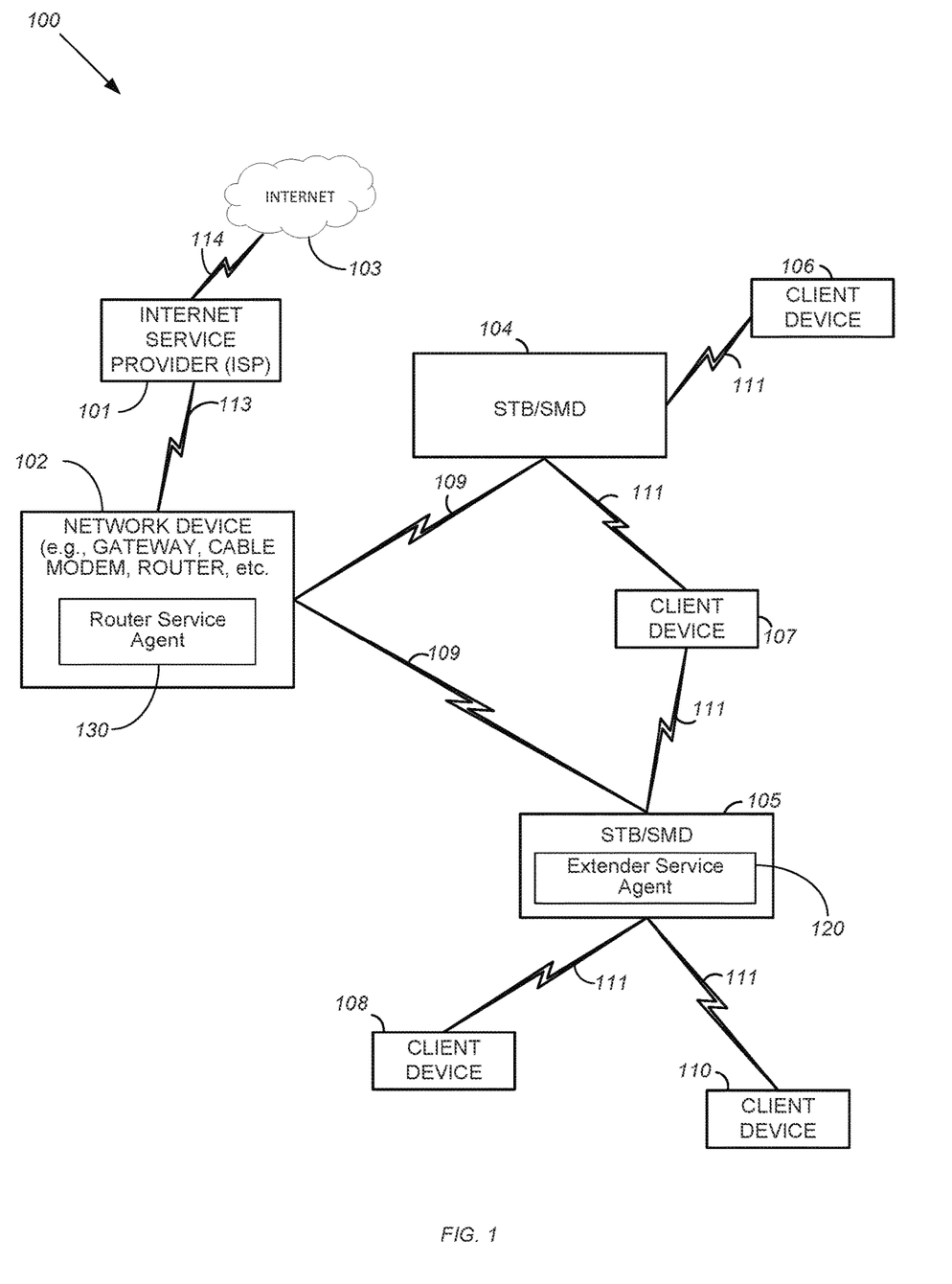
FIG. 1 is a schematic diagram of a system.

FIG. 1 is a schematic diagram of a system 100.

As shown in FIG. 1, the elements of the system include a network device 102 connected to the Internet 103 via an Internet Service Provider (ISP) 101 and also connected to different wireless devices, such as Set Top Boxes (STBs)/Smart Media Devices (SMDs) 104, 105 via connections 109. STBs/SMDs 104, 105 are connected to wireless client devices 106, 107, 108, 110 via connections 111. Network device 102 may be a gateway, cable modem, or router that provides for Internet access and content delivery to wireless client devices 106, 107, 108, 110 through STBs/SMDs 104, 105. Smart media devices (SMD), such as STBs/SMDs 104, 105, combine the important devices for a connected home into a single device, e.g., a set-top box, a smart speaker, a visual smart assistant, an IoT hub and remote control.

The system 100 shown in FIG. 1, including es wireless client devices 106, 107, 108, 110, STBs/SMDs 104, 105, and network device 102, may be connected in one or more wireless networks (e.g., private, guest, iControl, backhaul network, or Internet of things (IoT) network) within the system. Additionally, there could be some overlap between wireless devices (e.g., STBs/SMDs 104, 105, and wireless client devices 106, 107, 108, 110) in the different networks. That is, one or more network devices could be located in more than one network. For example, the STBs/SMDs 104, 105 could be located both in a private network for providing content and information to wireless client devices 106, 107, 108, 110, and also included in a backhaul network or an iControl network.

Starting from the top of FIG. 1, the ISP 101 can be, for example, a streaming video provider or any computer for connecting the network device 102 to the Internet 103. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the ISP 101 to network devices (e.g., STBs/SMDs 103, and wireless client devices 106, 107, 108, 110) in the system. It is also contemplated by the present disclosure that the network device 102 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

Connections 109 between the network device 102 and STBs/SMDs 104, 105, and connections 111 between STBs/SMDs 104, 105 and wireless client devices 106, 107, 108, 110 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, 60 GHz, etc. Additionally, the connection 109 can be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connection 109 can include connections to a media over coax (MoCA) network. One or more of the connections 109 can also be a wired Ethernet connection.

The STBs/SMDs 104, 105 can be, for example, hardware electronic devices that include a TV-tuner input to provide display output to a television set or other media consumption device, such as wireless client devices 106, 107, 108, 110. STBs/SMDs 104, 105 may also receive an external source of signal, turning the source signal into content in a form that can then be displayed on the television screen or other display device. STBs/SMDs 104, 105 may be used in cable television, satellite television, and over-the-air television systems as well as other uses. The STBs/SMDs 104, 105 can also receive signals from the wireless client devices 106, 107, 108, 110, and rebroadcast the signals to the network device 102, or other wireless client devices 106, 107, 108, 110.

Wireless client devices 106, 107, 108, 110 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the wireless client devices 106, 107, 108, 110 can be a mobile phone, a tablet computer, a gaming device, or other device that is capable of decoding audio/video content, and playing over over-the-top (OTT) or MSO provided content received through the network device 102.

Figure 3:
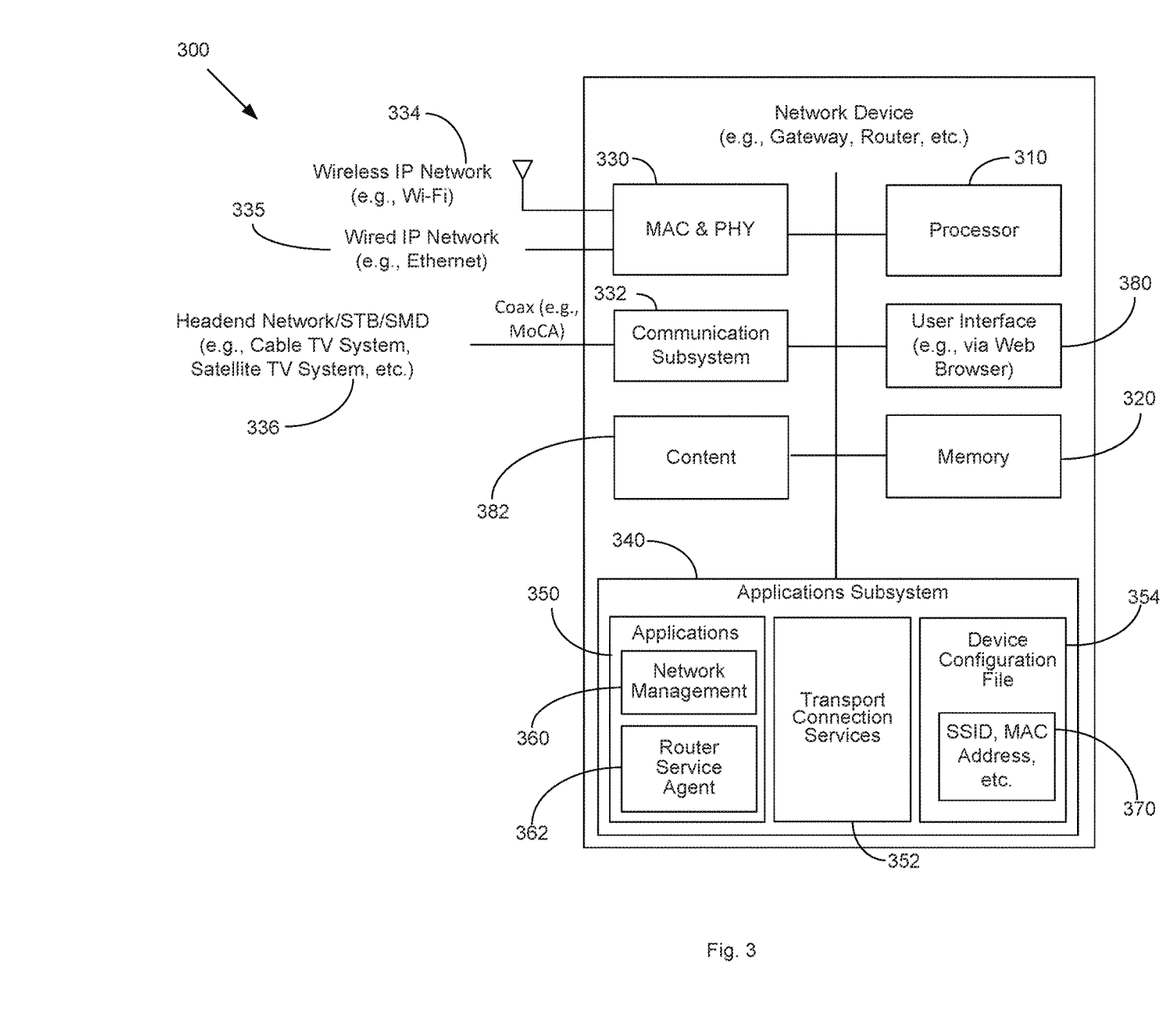
FIG. 3 is a block diagram of a network device.
Figure 4:
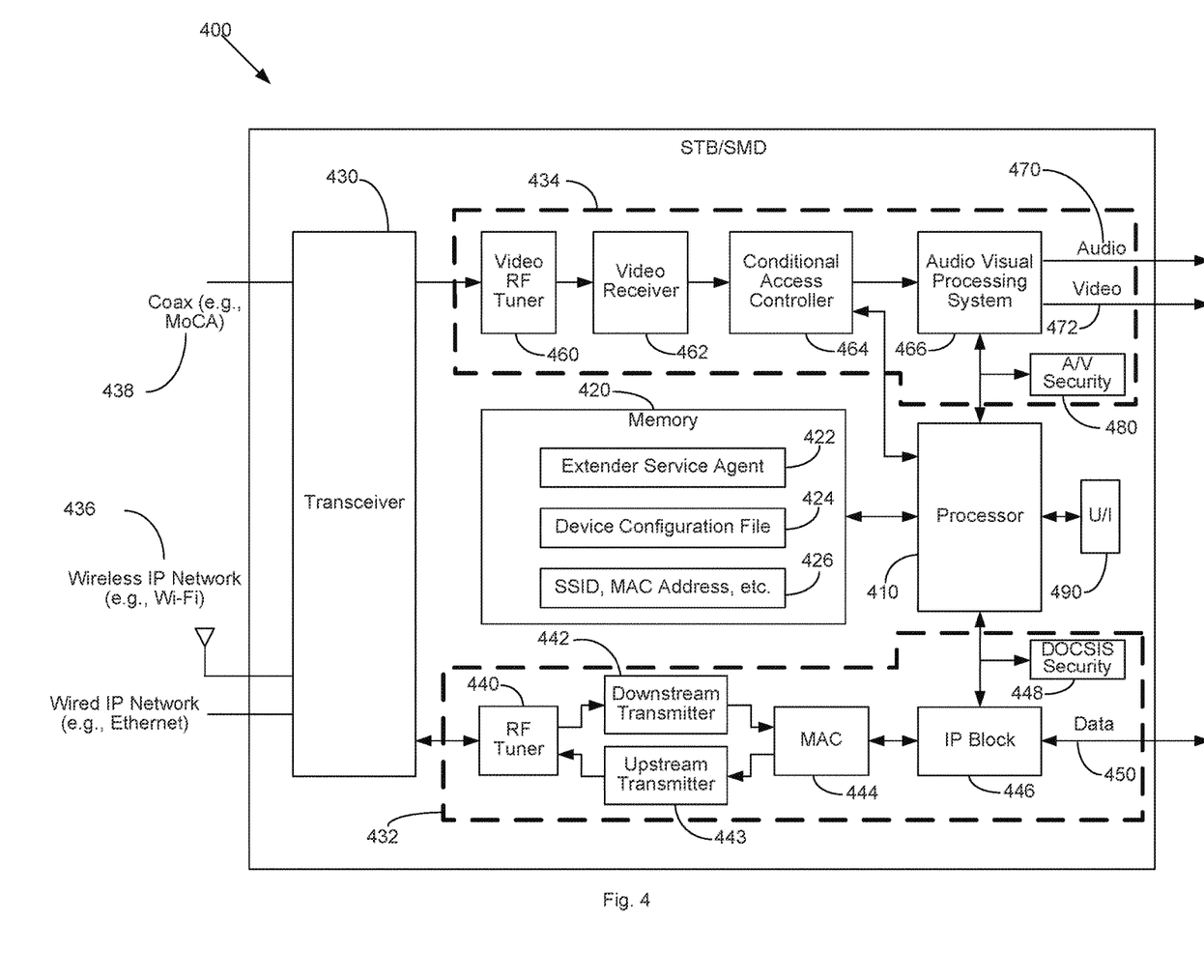
FIG. 4 is a block diagram of a STB/SMD.
Figure 5:
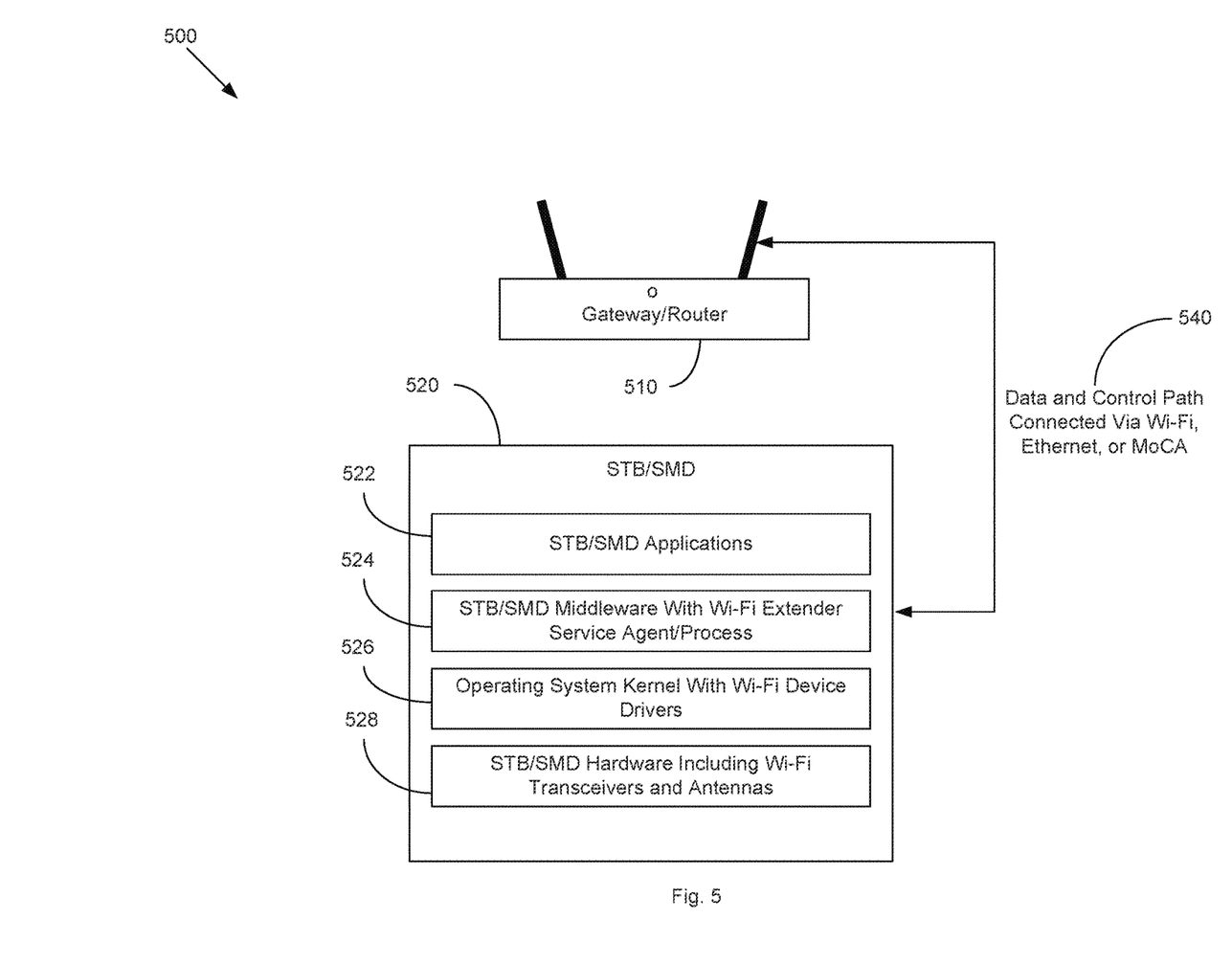
FIG. 5 is a functional block diagram of a system.

A detailed description of the exemplary internal components of the network device 102 and STBs/SMDs 104, 105 shown in FIG. 1 will be provided in the discussion of FIGS. 3-5. However, in general, it is contemplated by the present disclosure that the network device 102, the STBs/SMDs 104, 105, and the wireless client devices 106, 107, 108, 110 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the STBs/SMDs 104, 105, and wireless client devices 106, 107, 108, 110 may be adapted to execute any operating system, including Linux, UNIX, Windows, MacOS, DOS, and ChromOS as well as virtual machines adapted to virtualize execution of a particular operating system, including customized and proprietary operating systems. The network device 102, the STBs/SMDs 104, 105, and the wireless client devices 106, 107, 108, 110 are further equipped with components to facilitate communication with other computing devices over the one or more network connections to local and wide area networks, wireless and wired networks, public and private networks, and any other communication network enabling communication in the system.

STB/SMD 104 may provide Wi-Fi coverage for wireless client devices 106, 107. However, STB/SMD 104 may not provide Wi-Fi coverage to the entire home. Wi-Fi coverage provided by STB/SMD 104 does not provide Wi-Fi coverage to wireless client devices 108, 110, which may be located in a different room. To address this need, users will install an extender service agent in STB/SMD 105 that will further enhance the Wi-Fi coverage inside the home to the room where wireless client devices 108, 110 are currently located. As most of the rooms in the home will have a STB/SMD, such as STB/SMD 104, as well as a TV, extender capability may be provided on the STB/SMD 105. STB/SMD 105 may be connected to the broadband home router, such as network device 102, via either a wired or wireless connection.

STBs/SMDs 104, 105 may thus process received multi-service content for presentation by content consumption devices, such as wireless client devices 106, 107, 108, 110, and provide a backhaul connection for communicating data to a router, such as may be provided by network device 102. STB/SMD 105 downloads and configures an extender service agent 120 for implementing extender capability at STB/SMD 105. STB/SMD 105 pairs the extender service agent 120 with network device 102 to provide broadband Internet connectivity via the backhaul connection. STB/SMD 105 may include a transceiver that is controlled by the extender service agent to provide extended wireless IP connectivity using a fronthaul connection via the antenna to wireless client devices 108, 110 in range of IP signals radiated by the antenna of STB/SMD 105.

Connection 109 from STB/SMD 105 to the network device 102 provides a backhaul connection that includes an IP backhaul connection for providing the wireless IP connectivity. STB/SMD 105 may use a wired connection 109 to network device 102 and the fronthaul connection may then use all of an available bandwidth of the transceiver and the antenna of STB/SMD 105. Alternatively, STB/SMD 105 may use a wireless connection 109, wherein the fronthaul connection 111 to wireless client devices 108, 110, and the backhaul connection 109 to network device 102 split an available bandwidth of the transceiver and the antenna.

The extender service agent 120 of STB/SMD 105 may provide user presence detection to offer a lower power mode that does not broadcast a Wi-Fi service set identifier (SSID), wherein the extender service agent 120 detects a presence of at least one of wireless client devices 108, 110, and switches to an operation mode to broadcast the Wi-Fi SSID to the detected wireless client devices 108, 110. User presence can be determined by Bluetooth low energy (BLE) activity, motion detection control, etc. BLE is a wireless personal area network technology that provided reduced power consumption and cost while maintaining a similar communication range. BLE may use the same 2.4 GHz radio frequencies as classic Bluetooth and allows sharing of a single radio antenna by dual-mode devices, but uses a different set of channels and uses a simpler modulation system. BLE devices are detected through a procedure based on broadcasting advertising packets. Application profiles include a find me profile (FMP) and a proximity profile (PXP). The FMP profile allows one device to issue an alert on a second misplaced device. The PXP profile allows a proximity monitor to detect whether a proximity reporter is within a close range. Physical proximity can be estimated using the radio receiver's RSSI value, although this does not have absolute calibration of distances. An alarm may be sounded when the distance between the devices exceeds a set threshold. Specific user based SSID radiation uses the Wi-Fi SSID only when presence of a particular user is present.

The extender service agent 120 may be configured manually by downloading a configuration file from network device 102. The user may enter setup input credentials manually to connect STB/SMD 105 with network device 102 to provide the extended wireless IP connectivity. The network device 102 and STBs/SMDs 104, 105 radiate Wi-Fi network signals with the same configurations. The network device 102 and STBs/SMDs 104, 105 are independent/agnostic to each other and are not aware of the presence of the other device in the network. This mode of configurations will help to enable heterogenous (i.e., different vendors) network device 102 and STBs/SMDs 104, 105 work together.

In another embodiment, the extender service agent 120 may detect a router service agent 130 at the network device 102 and performs automatic configuration. The router service agent 130 provides configuration information to the extender service agent 120 for completing setup of the extender service agent 120. The extender service agent 120 may communicate with the network device via a data and control path. In this approach both the network device 102 and STBs/SMDs 104, 105 devices work in collaboration with each other and aware of the existence of each other. This type of configuration can be practical to expect when both network device 102 and STBs/SMDs 104, 105 are from the same vendor that provides unified communication details between the network device 102 and STBs/SMDs 104, 105.

Thus, using the extender service agent 120, STB/SMD 105 acts as an extender, which avoids the need for installation of a Wi-Fi extender or repeater in the room having poor Wi-Fi coverage from STB/SMD 104. Since STBs/SMDs are used in almost all the rooms of a home, strong Wi-Fi coverage may be provided to the entire home via STB/SMD 105 with the installed extender service agent 120. A single antenna of the STB/SMD 105 may efficiently utilizes the bandwidth provided by STB/SMD 105 for fronthaul, or for both backhaul and fronthaul. Repeaters are different category devices and as such do not use or process backhaul data apart from repeating received data. Thus, the antenna(s) of STB/SMD 105 may be used for IP content playback (via the backhaul channel) and also act as an extender (for a fronthaul channel). For example, when the extender service agent 120 of STB/SMD 105 uses the antenna(s) of STB/SMD 105 for both backhaul and for fronthaul, the bandwidth of the antenna(s) that are used is split between fronthaul and backhaul. However, STB/SMD 105 may, for example, be implemented with 2×2, 3×3, or 4×4 antennas. A STB/SMD 105 with a 2×2 radio may provide a bandwidth of 300 Mbps whereas a STB/SMD 105 with a 4×4 radio may provide a bandwidth of 1.3 Gbps. If MoCA or Ethernet are used by the STB/SMD 105 for backhaul, then the fronthaul may use all bandwidth of antenna. Further, STB/SMD 105 may integrate a software access point (SoftAP). The extender service agent 120 of STB/SMD 105 eliminates the need to buy an additional device (e.g., a stand-alone extender) to provide additional Wi-Fi coverage.

Figure 2:
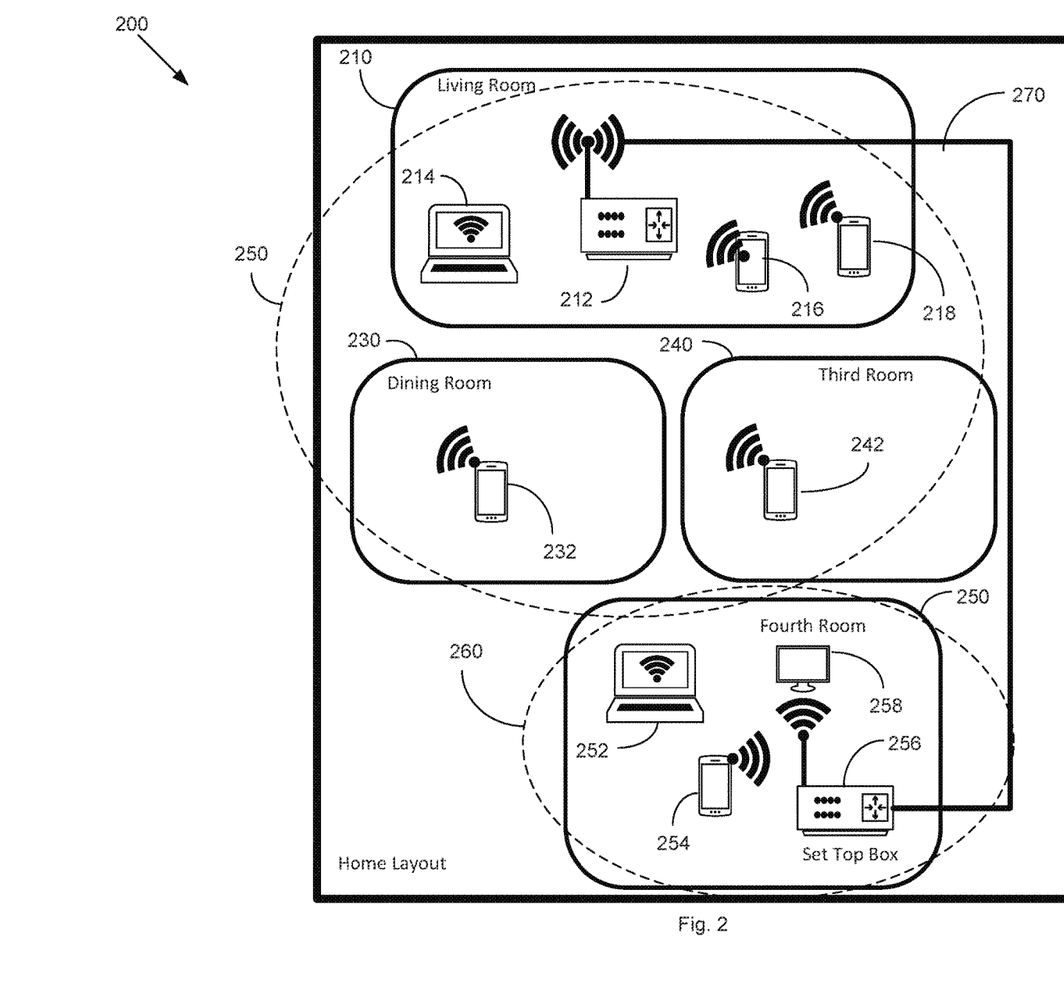
FIG. 2 illustrates a layout of a home showing Wi-Fi coverage.

FIG. 2 illustrates a layout of a home 200 showing Wi-Fi coverage.

In FIG. 2, a home 200 includes a living room 210, a dining room 230, a third room 240 and a fourth room 250. In the living room 210 a STB/SMD 212 provides content and wireless connectivity for wireless client devices 214, 216, 218. Wireless client device 232 is located in the dining room 230 and wireless client device 242 is located in the third room 240. A range 250 for connectivity of STB/SMD 212 is shown covering the living room 210, dining room 230 and the third room 240. Thus, wireless client devices 214, 216, 218 in living room 210, wireless client device 232 in the dining room 230, and wireless client device 242 in the third room 240 are within the range 250 provided by STB/SMD 212. However, wireless client devices 252, 254, 258 in the fourth room 250 are outside the range 250 of STB/SMD 212. STB/SMD 256 may provide content to wireless client devices 252, 254, 258, but Wi-Fi connectivity from STB/SMD 212 does not extend to wireless client devices 252, 254, 258. Since STB/SMD 212 does not provide Wi-Fi coverage to the entire home, an extender service agent may be downloaded and configured in STB/SMD 256, which will further enhance the Wi-Fi coverage inside the home to the fourth room 250 where wireless client devices 252, 254, 258 are located. STB/SMD 256 may connect the broadband home router, such as STB/SMD 212, via either a wired or wireless connection.

FIG. 3 is a block diagram of a network device 300.

In FIG. 3, the network device 300 includes a processor 310, memory 320, media access control (MAC)/physical layer (PHY) 330, communication subsystem 332, applications subsystem 340, user interface 3890, and content 382. Processor 310 accesses instructions in memory 320 to execute operations of the network device 300. Applications subsystem 340 includes applications 350, including network management 360 and router service agent 362. During automatic configuration of the extender service agent on the STB/SMD, the router service agent 362 provides configuration information to the extender service agent for completing setup of the extender service agent.

Applications subsystem 340 further transport connection services and device configuration files 354. Device configuration files 354 include service set identifiers (SSIDs), MAC addresses, etc. 370. MAC/PHY 330 initializes and maintains connectivity via wireless IP network 334, e.g., Wi-Fi, and wired IP network 335, e.g., Ethernet. Communication subsystem 332 provides communications over coax 336, e.g., using MoCA. Such communication may be between the network device 300 and a headend network or be between the network device 300 and STBs/SMDs.

FIG. 4 is a block diagram of a STB/SMD 400.

In FIG. 4, the STB/SMD 400 includes processor 410, memory 420, and transceiver 430. Part of the incoming signal is forwarded to the RF tuner 440 in the DOCS block 432. DOCS processing block 432 includes RF tuner 440, downstream transmitter 442, upstream transmitter 443, MAC 444, IP block 446, DOCS security 448, data port 450. Transceiver 430 provides wireless IP network communication (such as Wi-Fi) and wired network communication 436 (such as Ethernet), and communication over coax cable 438, such as MoCA. Video content signals are provided to video QAM processing block 434. Video QAM processing block 434 includes video RF tuner 460, video receiver 462, conditional access controller 464, audio visual processing system 466, audio output 470, video output 472, A/V security 480. It will be appreciated that the multiple content channels may be delivered over the same RF channel, so video RF tuner 460 may not change, even if the subscriber accesses another content channel. STB/SMD 400 also includes a user interface (U/I) 490. Memory 420 includes extender service agent 422, device configuration file 424, and SSID/MAC address, etc. 426.

All downstream signals present at data port 450 are broadcast to all subscribers connected to the MSO's head end equipment. Thus, unless methods are used to conditionally allow access of premium content to subscribers who have paid for such service and deny it to those who have not, everyone connected to the MSO's head end equipment would be capable of receiving all premium content intended only for those how have paid for it.

STB/SMD 400 may download and configure the extender service agent 422 to provide Wi-Fi coverage for wireless client devices, thereby enhancing Wi-Fi coverage inside the home to rooms proximate to the STB/SMD 400. STB/SMD 400 may thus process received multi-service content for presentation by content consumption devices, and provide a backhaul connection for communicating data to a network device as described earlier. STB/SMD 400 pairs the extender service agent 422 with a network device 102 to provide broadband Internet connectivity via the backhaul connection. STB/SMD 400 may include a transceiver 430 that is controlled by the extender service agent 422 to provide extended wireless IP connectivity using a fronthaul connection via the wireless IP network signals 436 radiated by the antenna of STB/SMD 400.

STB/SMD 400 may use a wired IP network signals to communicate with a network device and the fronthaul connection may then use all of an available bandwidth of the transceiver and the antenna of STB/SMD 400. Alternatively, STB/SMD 400 may use a wireless IP network signals 436, wherein the fronthaul connection, and the backhaul connection to network device splits an available bandwidth of the transceiver 430.

The extender service agent 422 of STB/SMD 400 may provide user presence detection to offer a lower power mode that does not broadcast a Wi-Fi service set identifier (SSID) and MAC address 426, wherein the extender service agent 422 detects a presence of at least one wireless client devices, and switches to an operation mode to broadcast the Wi-Fi SSID and MAC address 426 to the detected wireless client devices. User presence can be determined by Bluetooth low energy (BLE) activity, motion detection control, etc. BLE is a wireless personal area network technology that provided reduced power consumption and cost while maintaining a similar communication range. BLE may use the same 2.4 GHz radio frequencies as classic Bluetooth and allows sharing of a single radio antenna by dual-mode devices, but uses a different set of channels and uses a simpler modulation system. BLE devices are detected through a procedure based on broadcasting advertising packets. Application profiles include a find me profile (FMP) and a proximity profile (PXP). The FMP profile allows one device to issue an alert on a second misplaced device. The PXP profile allows a proximity monitor to detect whether a proximity reporter is within a close range. Physical proximity can be estimated using the radio receiver's RSSI value, although this does not have absolute calibration of distances. An alarm may be sounded when the distance between the devices exceeds a set threshold. Specific user based SSID radiation uses the Wi-Fi SSID only when presence of a particular user is present.

The extender service agent 422 may be configured manually by downloading a configuration file from a network device, e.g., network device 300 of FIG. 3. The user may enter setup input credentials manually to connect STB/SMD 400 with a network device to provide the extended wireless IP connectivity. The STB/SMD 400 radiate Wi-Fi network signals 436 with the same configurations. The STB/SMD 400 is independent/agnostic to the network device and is not aware of the presence of the network device in the network. This mode of configurations will help to enable heterogenous (i.e., different vendors) STB/SMD 400 work together with network devices of the same vendor.

In another embodiment, the extender service agent 422 may detect a router service agent at a network device and perform automatic configuration. The extender service agent 422 receives configuration information from a router service agent at a network device and provides for completing setup of the extender service agent 422. The extender service agent 422 may communicate with the network device via a data and control path. In this approach both the network device and STB/SMD 400 work in collaboration with each other and are aware of the existence of each other. This type of configuration can be practical to expect when both network device and STB/SMD 400 are from the same vendor that provides unified communication details between the network device and STB/SMD 400.

Thus, using the extender service agent 422, STB/SMD 400 acts as an extender, which avoids the need for installation of a Wi-Fi extender or repeater in the room having poor Wi-Fi coverage from another STB/SMD. Since a STB/SMD is used in almost every rooms of a home, strong Wi-Fi coverage may be provided to the entire home via STB/SMD 400 with the installed extender service agent 422. A single antenna of the STB/SMD 400 may efficiently utilizes the bandwidth provided by STB/SMD 400 for fronthaul, or for both backhaul and fronthaul. Repeaters are different category devices and as such do not use or process backhaul data apart from repeating received data. Thus, the antenna(s) of STB/SMD 400 may be used for IP content playback (via the backhaul channel) and also act as an extender (for a fronthaul channel). For example, when the extender service agent 422 of STB/SMD 400 uses the antenna(s) of STB/SMD 400 for both backhaul and for fronthaul, the bandwidth of the antenna(s) that are used is split between fronthaul and backhaul. However, STB/SMD 400 may, for example, be implemented with 2×2, 3×3, or 4×4 antennas. A STB/SMD 400 with a 2×2 radio may provide a bandwidth of 300 Mbps whereas a STB/SMD 400 with a 4×4 radio may provide a bandwidth of 1.3 Gbps. If MoCA 438 or Ethernet 436 are used by the STB/SMD 400 for backhaul, then the fronthaul may use all bandwidth of antenna. Further, STB/SMD 400 may integrate a software access point (SoftAP). The extender service agent 422 of STB/SMD 400 eliminates the need to buy an additional device (e.g., a stand-alone extender) to provide additional Wi-Fi coverage.

FIG. 5 is a functional block diagram of a system 500.

In FIG. 5, the system 500 includes a gateway/router 510 and a STB/SMD 520. Gateway/router 510 and STB/SMD 520 are connected by a data and control path 540. Data and control path 540 may connect STB/SMD 520 to gateway/router 510 via a Wi-Fi connection, an Ethernet connection, or a multimedia over coax alliance (MoCA) connection. MoCA provides a layer 2 transport protocol to enable distribution of content over existing in-home coaxial cabling. STB/SMD 520 includes STB/SMD applications 522, such as a watch-and-record capability application, web services applications, such as Netflix® and YouTube®, ecommerce applications, and non-video applications, such as web browsing, video mail and mobile email. STB/SMD 520 includes STB/SMD middleware with Wi-Fi extender service agent/processes 524 including digital content delivery and playout management, application management, execution environment control, Application Programming Interfaces (API) to control the underlying hardware/OS, etc. STB/SMD 520 also includes an operating system kernel with Wi-Fi device drivers 526 to provide operational management including disk management, memory management, task management, etc. STB/SMD 520 further includes STB/SMD hardware including Wi-Fi transceivers and antennas 528.

Figure 6:
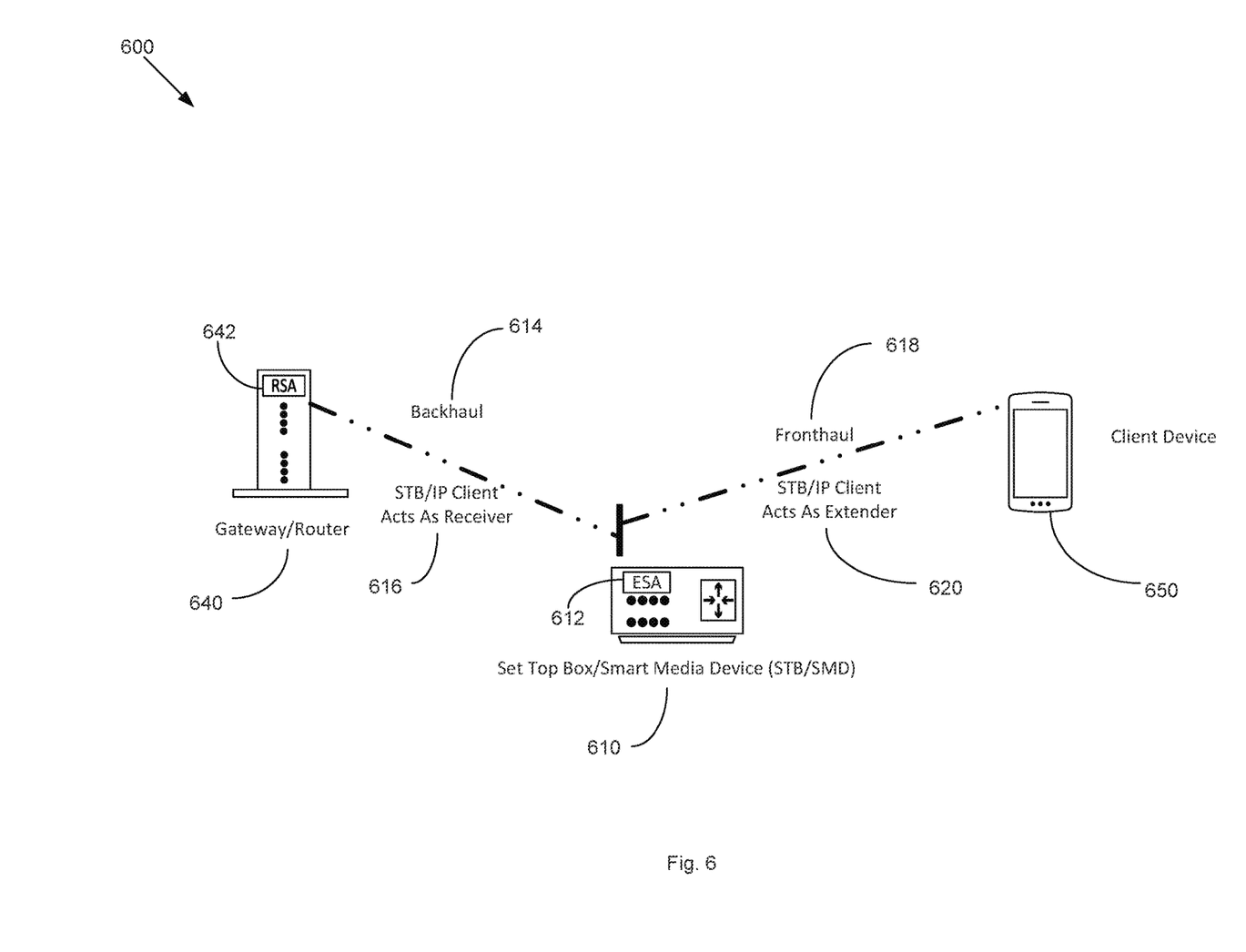
FIG. 6 is a flow diagram for a STB/SMD with an extender service agent.

FIG. 6 is a flow diagram 600 for a STB/SMD with an extender service agent.

In FIG. 6, a STB/SMD 610 has an extender service agent 612 installed and configured for providing IP connectivity from gateway/router 640 to client device 650. Gateway/router 640 includes a router service agent 642. The STB/SMD 610 with an extender service agent 612 installed provides a backhaul channel 614 and a front haul channel. STB/SMD 610 acts as a receiver 616 for receiving communication via the backhaul channel 614 from the gateway/router 640. STB/SMD 610 acts as an extender for providing IP connectivity, such as Wi-Fi, to the client device 650 via the fronthaul channel 618.

Figure 7:
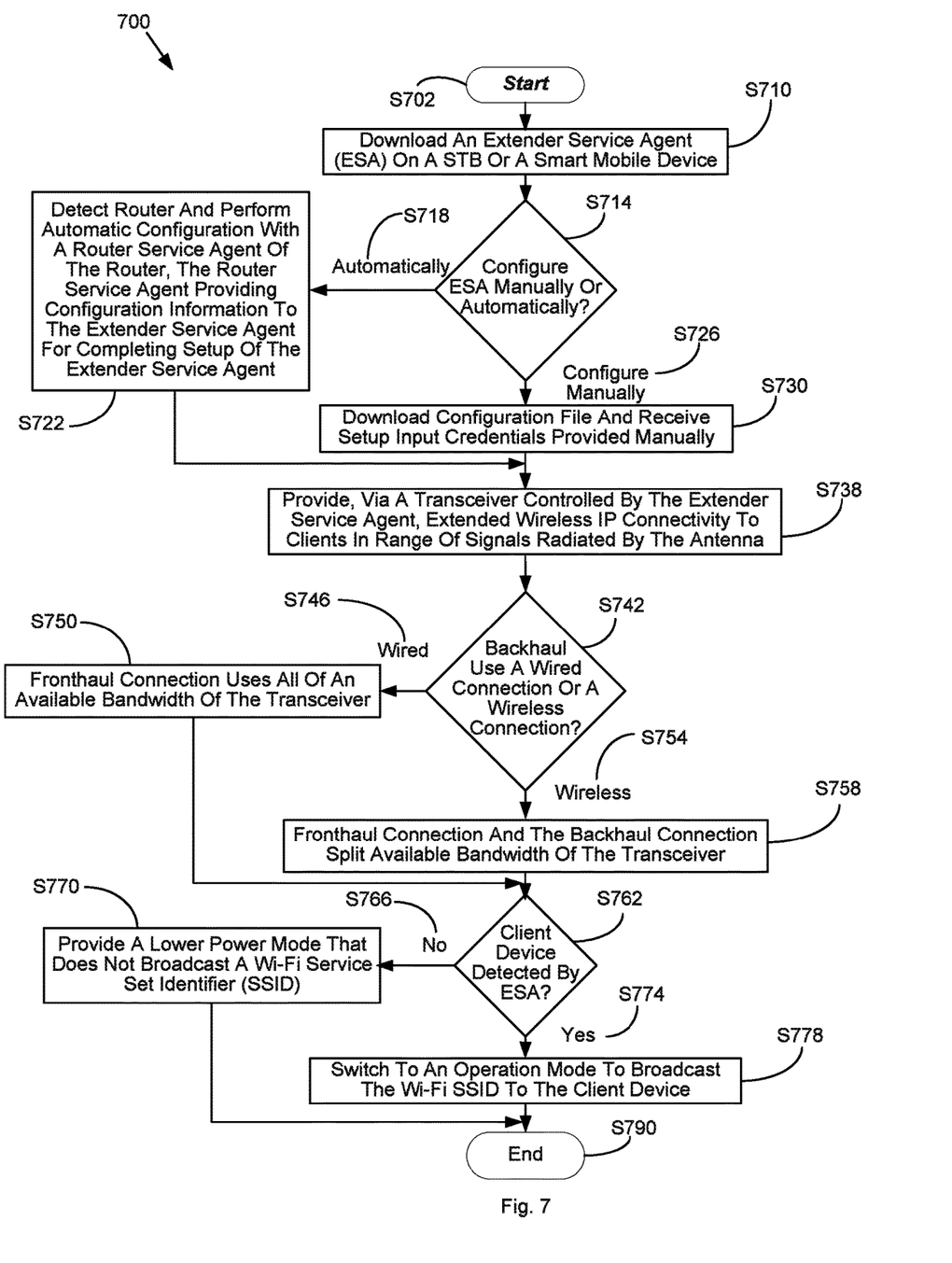
FIG. 7 illustrates a flow chart showing operation of a Wi-Fi/IP receiver with an extender service agent installed.

FIG. 7 illustrates a flow chart 700 showing operation of a Wi-Fi/IP receiver with extender service agent installed.

In FIG. 7, method 700 starts (S702), and an extender service agent is downloaded to the STB/SMD (S710). Referring to FIG. 1, users will install an extender service agent in STB/SMD 105 that will further enhance the Wi-Fi coverage inside the home to the room where wireless client devices 108, 110 are currently located. As most of the rooms in the home will have a STB/SMD, such as STB/SMD 104, as well as a TV, extender capability may be provided on the STB/SMD 105. STB/SMD 105 may be connected to the broadband home router, such as network device 102, via either a wired or wireless connection. STB/SMD 105 downloads and configures an extender service agent 120 for implementing extender capability at STB/SMD 105. STB/SMD 105 pairs the extender service agent 120 with network device 102 to provide broadband Internet connectivity via the backhaul connection.

A determination is made whether configuration is performed manually or automatically (S714). When configuration is to be performed automatically (S718), a router service agent of the router is detected, the router service agent provides configuration information to the extender service agent for completing setup of the extender service agent (S722). Referring to FIG. 1, the extender service agent 120 may detect a router service agent 130 at the network device 102 and performs automatic configuration. The router service agent 130 provides configuration information to the extender service agent 120 for completing setup of the extender service agent 120. The extender service agent 120 may communicate with the network device via a data and control path. In this approach both the network device 102 and STBs/SMDs 104, 105 devices work in collaboration with each other and aware of the existence of each other. This type of configuration can be practical to expect when both network device 102 and STBs/SMDs 104, 105 are from the same vendor that provides unified communication details between the network device 102 and STBs/SMDs 104, 105.

When configuration is to be performed manually (S726), a configuration file is downloaded, and setup input credentials are entered manually (S730). Extended wireless IP connectivity is provided, via a transceiver controlled by the extender service agent, to clients in range of signals radiated by the antenna (S738). Referring to FIG. 1, the extender service agent 120 may be configured manually by downloading a configuration file from network device 102. The user may enter setup input credentials manually to connect STB/SMD 105 with network device 102 to provide the extended wireless IP connectivity. The network device 102 and STBs/SMDs 104, 105 radiate Wi-Fi network signals with the same configurations. The network device 102 and STBs/SMDs 104, 105 are independent/agnostic to each other and are not aware of the presence of the other device in the network. This mode of configurations will help to enable heterogenous (i.e., different vendors) network device 102 and STBs/SMDs 104, 105 work together.

A determination is made whether a wired connection or a wireless connection is to be used for the backhaul connection (S742). When a wired connection is to be used (S746), the fronthaul connection uses all of an available bandwidth of the transceiver (S750). Referring to FIG. 1, connection 109 from STB/SMD 105 to the network device 102 provides a backhaul connection that includes an IP backhaul connection for providing the wireless IP connectivity. STB/SMD 105 may use a wired connection 109 to network device 102 and the fronthaul connection may then use all of an available bandwidth of the transceiver and the antenna of STB/SMD 105.

When a wireless connection is to be used (S754), the fronthaul connection and the backhaul connection split the available bandwidth of the transceiver (S758). Referring again to FIG. 1, STB/SMD 105 may use a wireless connection 109, wherein the fronthaul connection 111 to wireless client devices 108, 110, and the backhaul connection 109 to network device 102 split an available bandwidth of the transceiver and the antenna.

A determination is made whether a client device is detected by the extender service agent (S762). When a client device is not detected by the extender service agent (S766), a lower power mode is provided that does not broadcast a Wi-Fi service set identifier (SSID). Referring to FIG. 1, the extender service agent 120 of STB/SMD 105 may provide user presence detection to offer a lower power mode that does not broadcast a Wi-Fi service set identifier (SSID) when the presence of at least one of wireless client devices 108, 110 is not detected.

When a client device is detected by the extender service agent (S774), the STB/SMD switches to an operation mode to broadcast the Wi-Fi SSID to the client device (S778), and method 700 ends (S790). Referring to FIG. 1, when the extender service agent 120 detects a presence of at least one of wireless client devices 108, 110, and the STB/SMD 105 switches to an operation mode to broadcast the Wi-Fi SSID to the detected wireless client devices 108, 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations.

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A set top box, comprising:
   at least one antenna;
   a memory storing computer-readable instructions; and
   a processor configured to execute the computer-readable instructions to:
   process received multi-service content for presentation by content consumption devices;
   provide a backhaul connection for communicating data to and from a router;
   download an extender service agent to the set top box;
   configure the extender service agent for implementing extender capability at the set top box;
   pair the extender service agent with the router to provide broadband Internet connectivity via the backhaul connection; and
   provide, via a transceiver controlled by the extender service agent, extended wireless IP connectivity using a fronthaul connection via the antenna to clients in range of IP signals radiated by the antenna.

2. The set top box of claim 1, wherein the backhaul connection includes an IP backhaul connection to the router for providing the wireless IP connectivity.

3. The set top box of claim 2, wherein the IP backhaul connection to the router comprises a wired connection, the fronthaul connection using all of an available bandwidth of the transceiver and the antenna.

4. The set top box of claim 2, wherein the IP backhaul connection to the router comprises a wireless connection, the fronthaul connection and the backhaul connection splitting an available bandwidth of the transceiver and the antenna.

5. The set top box of claim 1, wherein the extender service agent provides user presence detection to provide a lower power mode that does not broadcast a Wi-Fi service set identifier (SSID), the extender service agent detecting a presence of a client device and switching to an operation mode to broadcast the Wi-Fi SSID to the client device.

6. The set top box of claim 1, wherein the extender service agent is configured manually by downloading a configuration file and receiving setup input credentials entered manually to connect with the router to provide the extended wireless IP connectivity.

7. The set top box of claim 1, wherein the extender service agent detects the router and performs automatic configuration with a router service agent of the router, the router service agent providing configuration information to the extender service agent for completing setup of the extender service agent.

8. The set top box of claim 1, wherein the extender service agent communicates with the router via a data and control path.

9. A method for providing extender capability to a set top box, comprising:
   processing received multi-service content for presentation by content consumption devices;
   processing, at a set top box, received multi-service content for presentation by content consumption devices;
   providing a backhaul connection of the set top box for communicating data to and from a router;

downloading an extender service agent to the set top box;
configuring the extender service agent for implementing extender capability at the set top box;
pairing the extender service agent at the set top box with the router to provide broadband Internet connectivity by the set top box via the backhaul connection; and
providing, via a transceiver controlled by the extender service agent, extended wireless IP connectivity using a fronthaul connection by the set top box via the antenna to clients in range of IP signals radiated by the antenna.

10. The method of claim 9, wherein the providing the backhaul connection comprises providing an IP backhaul connection to the router for providing the extended wireless IP connectivity.

11. The method of claim 10, wherein the providing the IP backhaul connection comprises providing a wired IP backhaul connection to the router, wherein the fronthaul connection uses all of an available Wi-Fi bandwidth of the transceiver and the antenna.

12. The method of claim 10, wherein the providing the IP backhaul connection comprises providing a wireless IP backhaul connection to the router, wherein the available Wi-Fi bandwidth of the transceiver and the antenna is split between the fronthaul connection and the wireless IP backhaul connection.

13. The method of claim 9 further comprising providing user presence detection to the extender service agent to implement, by the extender service agent, a lower power mode by not broadcasting a Wi-Fi service set identifier (SSID), and to implement, by the extender service agent, an operation mode by detecting the presence of a client device and broadcasting the Wi-Fi SSID to the client device.

14. The method of claim 9 further comprises configuring the extender service agent using one or a manual configuration or an auto-configuration, wherein the manual configuration comprises downloading a configuration file and receiving manually entered setup input credentials to connect with the router to provide the extended wireless IP connectivity, and the auto-configuration comprises detecting the router and performing automatic configuration with a router service agent of the router, the router service agent providing configuration information to the extender service agent for completing setup of the extender service agent.

15. A non-transitory computer-readable media having computer-readable instructions stored thereon, which when executed by a processor causes the processor to perform operations of a set top box comprising:
processing, at a set top box, received multi-service content for presentation by content consumption devices;
providing a backhaul connection of the set top box for communicating data to and from a router;
downloading an extender service agent to the set top box;
configuring the extender service agent for implementing extender capability at the set top box;
pairing the extender service agent at the set top box with the router to provide broadband Internet connectivity by the set top box via the backhaul connection; and
providing, via a transceiver controlled by the extender service agent, extended wireless IP connectivity using a fronthaul connection by the set top box via the antenna to clients in range of IP signals radiated by the antenna.

16. The non-transitory computer-readable media of claim 15, wherein the providing the backhaul connection comprises providing an IP backhaul connection to the router for providing the extended wireless IP connectivity.

17. The non-transitory computer-readable media of claim 16, wherein the providing the IP backhaul connection comprises providing a wired IP backhaul connection to the router, wherein the fronthaul connection uses all of an available Wi-Fi bandwidth of the transceiver and the antenna.

18. The non-transitory computer-readable media of claim 16, wherein the providing the IP backhaul connection comprises providing a wireless IP backhaul connection to the router, wherein the available Wi-Fi bandwidth of the transceiver and the antenna is split between the fronthaul connection and the wireless IP backhaul connection.

19. The non-transitory computer-readable media of claim 15 further comprising providing user presence detection to the extender service agent to implement, by the extender service agent, a lower power mode by not broadcasting a Wi-Fi service set identifier (SSID), and to implement, by the extender service agent, an operation mode by detecting the presence of a client device and broadcasting the Wi-Fi SSID to the client device.

20. The non-transitory computer-readable media of claim 15 further comprises configuring the extender service agent using one or a manual configuration or an auto-configuration, wherein the manual configuration comprises downloading a configuration file and receiving manually entered setup input credentials to connect with the router to provide the extended wireless IP connectivity, and the auto-configuration comprises detecting the router and performing automatic configuration with a router service agent of the router, the router service agent providing configuration information to the extender service agent for completing setup of the extender service agent.

* * * * *